United States Patent [19]

Mochida et al.

[11] 4,293,903
[45] Oct. 6, 1981

[54] HIGH VOLTAGE RECTIFIER FOR TELEVISION RECEIVER SETS

[75] Inventors: Hideyuki Mochida; Shingo Tamura; Etsuo Tsurumi, all of Yokohama, Japan

[73] Assignee: Hitachi, Ltd., Tokyo, Japan

[21] Appl. No.: 144,919

[22] Filed: Apr. 29, 1980

[30] Foreign Application Priority Data

May 2, 1979 [JP] Japan .......................... 54-58234[U]

[51] Int. Cl.³ .......................... H02M 7/10; H04N 3/18
[52] U.S. Cl. ........................................ 363/68; 315/411; 358/190; 363/126; 363/146
[58] Field of Search .................... 363/45, 67, 68, 100, 363/126, 146; 358/190; 174/52 PE; 336/185; 315/411

[56] References Cited

U.S. PATENT DOCUMENTS

| | | | |
|---|---|---|---|
| 3,814,989 | 6/1974 | Tamkin | 174/52 PE |
| 3,936,719 | 2/1976 | Miyoshi et al. | 363/126 |

OTHER PUBLICATIONS

Funkschau, vol. 48, No. 24, pp. 1051-1054, Nov. 1976.

*Primary Examiner*—William H. Beha, Jr.
*Attorney, Agent, or Firm*—Craig and Antonelli

[57] ABSTRACT

In a high voltage rectifier for use in a television receiver set, a resistor block is incorporated therein to produce focusing and screen voltages, and a focusing voltage feeder for supplying the focusing voltage to a cathode ray tube is covered by a screen voltage feeder for supplying the screen voltage to the cathode ray tube to form a unitary high voltage insulated cable.

5 Claims, 11 Drawing Figures

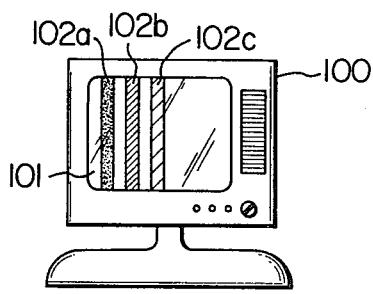
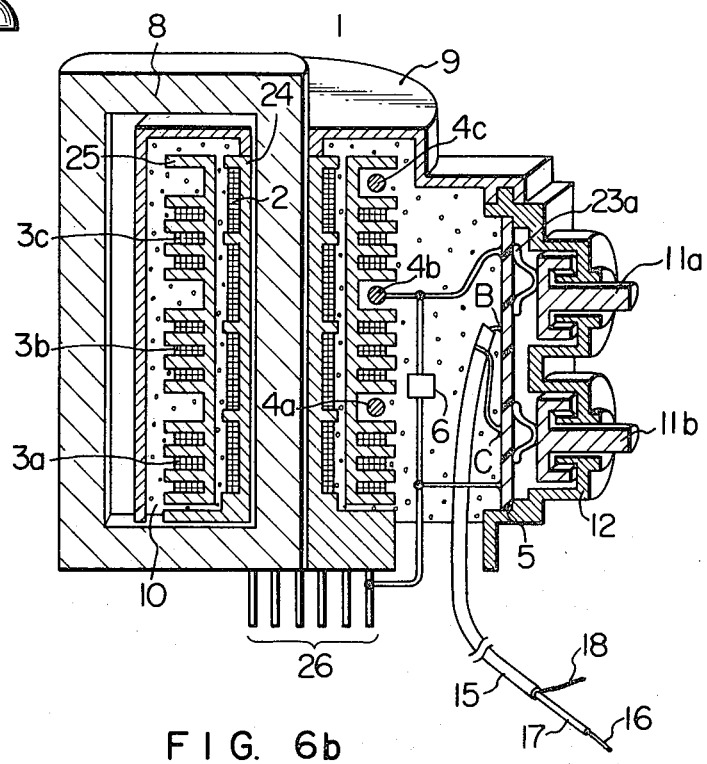
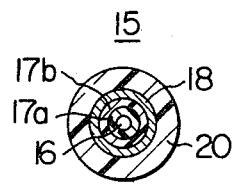
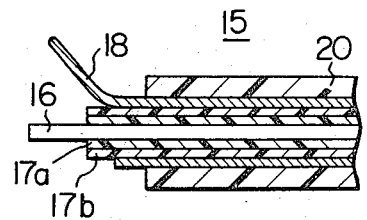

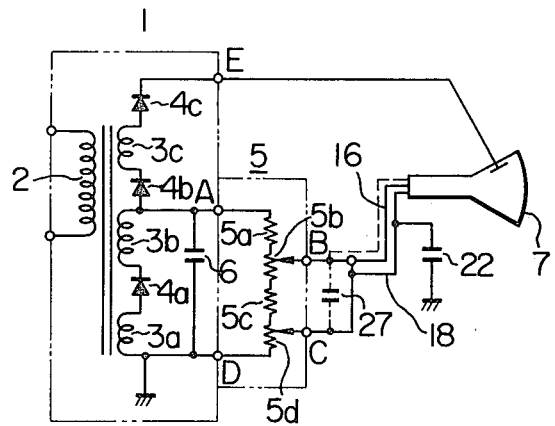
FIG. 7
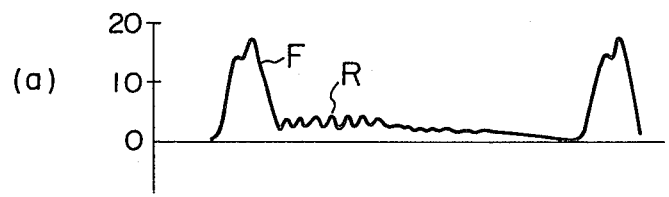
FIG. 8
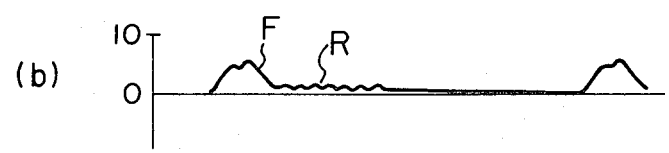
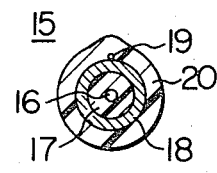
FIG. 9a
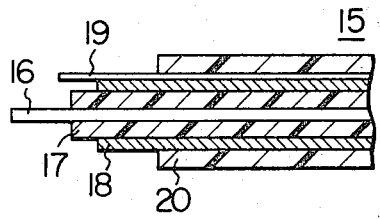
FIG. 9b

HIGH VOLTAGE RECTIFIER FOR TELEVISION RECEIVER SETS

This invention relates to high voltage rectifiers and more particularly to a rectifier unit for use in a television receiver set which rectifies a pulse generated by a flyback transformer into a DC high voltage with which currents are fed to anode, focusing and screen electrodes of a cathode ray tube.

Applied to the cathode ray tube of a television receiver set are various DC voltages of which a DC voltage of about 24 KV is applied to the anode electrode, about 86 KV to the focusing electrode and 600 to 700 V to the screen electrode. Usually, to obtain these voltages, a flyback pulse generated by a horizontal deflection circuit is boosted by a flyback transformer and the stepped-up pulse voltage is rectified by diodes.

With reference to FIG. 1 which illustrates a circuit of a prior art high voltge rectifer for feeding currents at high voltages to a cathode ray tube, the high voltage rectifier as generally designated at reference numeral 1 comprises a primary coil 2 connected to a horizontal deflection circuit (not shown), secondary coils 3a, 3b and 3c for boosting a flyback pulse generated in the primary coil 2, diodes 4a, 4b and 4c for rectifying pulse voltages generated in the secondary coils 3a, 3b and 3c, and a capacitor 6. A resistor block 5 is additionally incorporated into the rectifier. Voltage developing at the cathode of the diode 4c is fed to the anode of cathode ray tube 7 via a terminal E. Voltage occurring at the anode of the diode 4b is smoothed by the capacitor 6 and fed to the resistor block 5 via a terminal A. One end of the coil 3a connected to the capacitor 6 is coupled to a terminal D and to earth at common potential. The voltage relayed from the terminal A to the resistor block 5 is divided by fixed resistors 5a and 5c and variable resistors 5b and 5d. A divisional voltage from the variable resistor 5b is fed to the focusing electrode (not shown) of the cathode ray tube 7 via a terminal B and a divisional voltage from the variable resistor 5d to the screen electrode (not shown) of the cathode ray tube 7 via a terminal C. Reference is made to FIG. 2 which shows a perspective view, partly exploded, of the prior art high voltage rectifier. Mounted on a magnetic core 8 is a primary coil bobbin 24 about which the primary coil 2 is wound. The primary coil 2 is surrounded by a secondary coil bobbin 25 about which the secondary coils 3a, 3b and 3c are wound. A casing 9 houses the secondary coils 3a, 3b and 3c and an insulating resin 10 fills the casing 9. The high voltage rectifier 1 is mounted with the resistor block 5 which is supported by a cover 12. Mounted on the cover 12 are rotary shafts 11a and 11b. Slider 23a and 23b are secured to the tips of the rotary shafts 11a and 11b. High-voltage insulated wires 13 and 14 are connected to the resistor block 5 to feed voltages to the focusing and screen electrodes, respectively. Lead terminals 26 are provided for the primary coil bobbin 24. The resistor block 5, as detailed in a perspective view of FIG. 3, has an alumina plate 27 on which the fixed resistors 5a and 5b and variable resistors 5b and 5d are formed in the form of thick film resistors which are printed and sintered. The sliders 23a and 23b centrally raised as shown in FIG. 2 are pivoted on electrodes B' and C' so as to be slidable on the resistor films of the variable resistors 5b and 5d. Consequently, the variable resistors 5b and 5d provide variable voltages on the terminals B and C respectively connected to the electrodes B' and C'.

In such a prior art high voltage rectifier, the casing 9 houses the capacitor 6 and the resistor block 5 together with the coils 2, 3a, 3b and 3c and diodes 4a, 4b and 4c and it is filled with insulator 10 for integration of the above parts. With this construction, the terminals A, B, C and D, capacitor 6 and resistor block 5 will not be exposed exteriorly of the casing 9 so that the rectifier can be highly insulative.

Unless the capacitor 6 and resistor block 5 are integral with the coils 2, 3a, 3b and 3c and the diodes 4a, 4b and 4c, poor electrical insulation tends to result. This is because the surfaces of the capacitor 6 and the resistor block 5 applied with a high voltage of about 8.6 KV are liable to absorb dirt and dust so that leakage current flows through the dirt. In particular, when humidity in the air is high and the dirt is deposited with water droplets, the leakage current increases. Resistance of the resistors 5a, 5b, 5c and 5d of the resistor block 5 is 50 to 150 MΩ in total and hence a very small current of 100 to 200 μA flows through the resistor block 5. Consequently, if a leakage current of the order of several microamperes, for example, flows through the dirt and water droplets deposited on the surface of the resistor block 5, voltages developing at the terminals B and C, that is, voltages to be supplied to the focusing and screen electrodes of the cathode ray tube 7 are forced to vary. If the focusing voltage varies, picture images reproduced on the screen of the cathode ray tube 7 turn blue. If the screen voltage varies, for example, to decrease, brightness of reproduced picture images is lowered. As a result, the cathode ray tube 7 cannot reproduce picture images of high quality.

As described above, in the high voltage rectifier as shown in FIGS. 1, 2 and 3, the resistor block 5 and the capacitor 6 are housed in the casing 9 and shielded against deposition of dirt to thereby ensure that the leakage current can be minimized. However, since the resistor block 5 is housed in the casing 9 with the high voltage insulated wires 13 and 14 and the resistor block 5 itself located near the coils 3a, 3b and 3c, the resistors 5a, 5b, 5c and 5d and the high voltage insulated wires 13 and 14 tend to couple with the coils 3a, 3b and 3c electrostatically with the result that AC voltages (ringing voltages) generated in the coils 3a, 3b and 3c are superposed on DC voltages developing at the terminals B and C. If the ringing voltages are superposed on the DC voltages to be supplied to the focusing and screen electrodes, black vertical stripes 102a, 102b and 102c are periodically displayed on a picture screen 101 of a television receiver set 100 as shown in FIG. 4 and a picture image partly fades corresponding to the vertical stripes 102a, 102b and 102c.

In particular, the amplitude of the ringing voltage superposed on the DC voltage to be supplied to the focusing electrode is large. This ringing voltage is radiated from the high voltage insulated wire 13 acting as an antenna and received by a tuner and a video signal amplifier circuit of the television receiver set, thereby causing the vertical stripes 102a, 102b and 102c to occur.

If the resistor block 5 is sufficiently spaced apart from the coils 3a, 3b and 3c, the ringing voltages superposed on the DC voltages may be decreased. However, a bulky high voltage rectifier will result. Also, the ringing voltages superposed on the DC voltages can be by-passed and decreased by connecting capacitors 21 and 22 to the high voltage insulated wires 13 and 14. With the connection of the capacitors 21 and 22, however, the leakage current will increase which flows through dirt deposited on capacitors 21 and 22, especially on the capacitor 21 across which a high voltage is applied. Therefore, connection of the capacitor 21 across the terminals B and C is of disadvantage.

It is an object of this invention to provide a high voltage rectifier capable of feeding DC voltages to anode, focusing and screen electrodes of a cathode ray tube in a television receiver set and in which connection of a capacitor across terminals B and C can be eliminated, variations in DC voltages to be supplied to the focusing and screen electrodes can be minimized, and ringing voltages superposed on the DC voltages can be minimal.

If electrostatic coupling of the high voltage insulated wires with the coils is eliminated, ringing voltages induced in the high voltage insulated wires can be minimized, thereby giving rise to minimal vertical stripes reproduced on the picture screen. If ringing voltages induced in the resistor block can be by-passed without using a capacitor, affect of the leakage current can be eliminated to further minimize the vertical stripes occurring in a picture image displayed on the picture screen.

In accordance with this invention, a high voltage insulated wire connected to the focusing electrode of the cathode ray tube, namely, a focusing voltage feeder is covered and electrostatically shielded by a cylindrical high voltage insulated wire connected to the screen electrode, namely, a screen voltage feeder to form a unitary high voltage feeder. A capacitance is established by the focusing voltage feeder and the screen voltage feeder and ringing voltages induced in the resistor block can be by-passed from the focusing voltage feeder to the screen voltage feeder. This leads to minimal vertical stripes occurring in a picture image displayed on the picture screen. Advantageously, the focusing voltage feeder shielded by the screen voltage feeder cannot act as an antenna so that the radiation of ringing voltages from the focusing voltage feeder, which interferes with a tuner and the like circuits, can be prevented.

FIG. 4 is a diagram to show a front appearance of a television receiver set, the diagram being useful in explaining vertical stripes reproduced on the picture screen.

FIG. 5 is a perspective view, partly exploded, of a high voltage rectifier according to this invention.

FIG. 6a is a cross-sectional view of a unitary high voltage feeder according to this invention.

FIG. 6b is a longitudinal sectional view of the unitary high voltage feeder.

FIG. 7 is a circuit diagram of the high voltage rectifier according to this invention.

FIG. 8 is a wave-form diagram useful in explaining ringing voltages superposed on the focusing voltage.

FIG. 9a is a cross-sectional view of a modified unitary high voltage feeder according to this invention.

FIG. 9b is a longitudinal sectional view of the modified unitary high voltage feeder.

Figure 1:
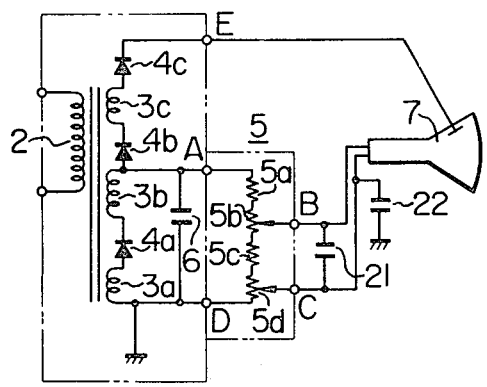
FIG. 1 is a circuit diagram of a prior art high voltage rectifier.
Figure 3:
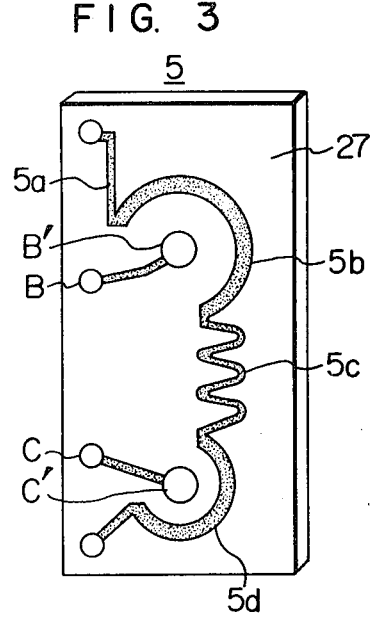
FIG. 3 is a perspective view of a resistor block.
Figure 2:
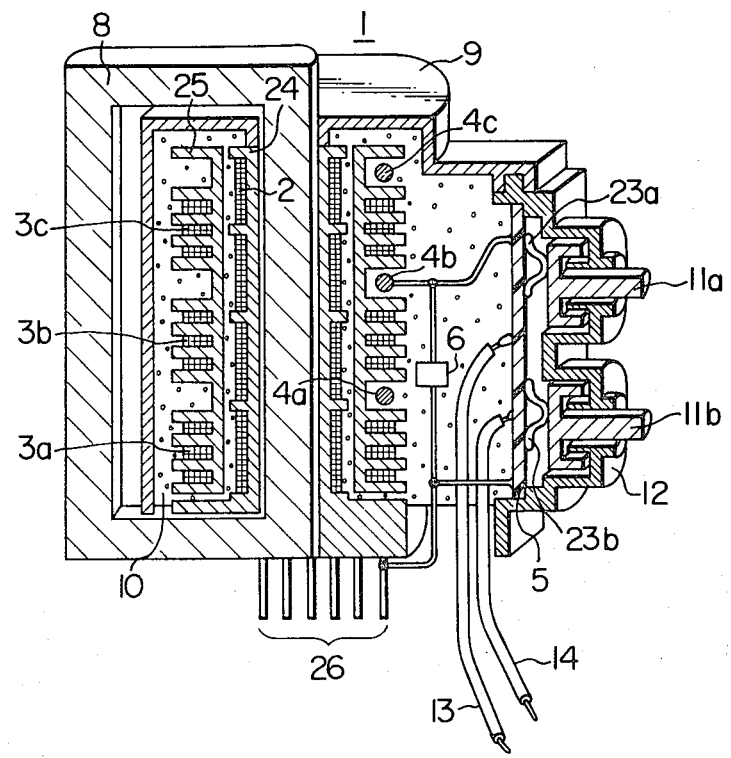
FIG. 2 is a perspective view, partly exploded, of the prior art high voltage rectifier.

Referring now to FIG. 5, a preferred embodiment of this invention will be described which is featured by a unitary high voltage cable comprised of a focusing voltage feeder and a screen voltage feeder. More particularly, in a high voltage rectifier of this invention, a focusing voltage feeder 16 and a screen voltage feeder 18 are put together to form a unitary high voltage insulated cable 15 which comprises an insulating layer 17 interposed between the screen voltage feeder 18 and the focusing voltage feeder 16. The insulating layer 17 is effective to electrically insulate the two feeders under the application of DC voltage.

As diagrammatically shown in FIGS. 6a and 6b, the unitary high voltage insulated cable 15 comprises insulating layers 17a and 17b which surround the focusing voltage feeder 16 in the form of a conductor, the screen voltage feeder 18 in the form of a conductor which surrounds the insulating layer 17b, and an outermost insulating layer 20 which surrounds the screen voltage feeder 18. Each of the focusing voltage feeder 16 and screen voltage feeder 18 consists of a plurality of tin-plated soft copper conductors. The insulating layer 17a is made of polyethylene and about 0.56 mm thick. The insulating layer 17b is made of vinyl chloride and about 0.65 mm thick. The insulating layer 20 is also made of vinyl chloride and about 0.85 mm thick. A rating dielectric strength between screen voltage feeder 18 and focusing voltage feeder 16 is designed to be about 20 KV. A capacitance is established between the focusing voltage and screen voltage feeders 16 and 18, which capacitance is selected to be of the order of 50 to 200 pF/m. The unitary high voltage insulated cable 15 has a length of 30 to 40 cm.

In the high voltage rectifier according to this invention which uses the unitary high voltage insulated cable 15 shown in FIGS. 6a and 6b, the focusing voltage feeder 16 is connected to the terminal B of the resistor block 5, the screen voltage feeder 18 is connected to the terminal C of the resistor block 5, and the focusing voltage feeder 16 is covered with the screen voltage feeder 18 whereby the latter feeder electrostatically shields the former feeder. Accordingly, electrostatic coupling of the focusing voltage feeder 16 with the coils 3a, 3b and 3c can be eliminated to thereby minimize ringing voltage induced in the focusing voltage feeder 16. On the other hand, even with the high voltage rectifier of this invention, the resistor block 5 couples with the coils 3a, 3b and 3c and ringing voltages induced in the resistor block 5 will be transmitted to the focusing voltage feeder 16. However, the focusing voltage feeder 16 advantageously shielded by the screen voltage feeder 18 prevents radiation therefrom of the ringing voltages. In addition, because of establishment of a capacitance of about 30 pF between the focusing voltage and screen voltage feeders 16 and 18, currents accruing from the ringing voltages transmitted to the focusing voltage feeder 16 can advantageously be by-passed through the capacitance.

The capacitance established by the focusing voltage and screen voltage feeders 16 and 18 is illustrated as a capacitor 27 in FIG. 7. It will be appreciated that the current due to the ringing voltage is by-passed through the capacitor 27 and then directed to earth by way of a capacitor 22.

In FIG. 8, there is shown a waveform R of a ringing voltage which follows a flyback pulse F, the ringing voltage being superposed on the focusing voltage. In the figure, a ringing voltage having an amplitude of about 2 Vp-p shown at (a) is caused in the prior art high voltage rectifier while a ringing voltage of an amplitude of about 1 Vp-p shown at (b) is superposed on the focusing voltage in the high voltage rectifier of this invention. In comparison, the amplitude of the ringing voltage superposed on the focusing voltage can be reduced by approximately half according to the present invention.

The unitary high voltage insulated cable can be modified as shown in FIGS. 9a and 9b. A modified unitary high voltage insulated cable 15 comprises a screen voltage feeder 18 made of electroconductive polyethylene, and a single lead conductor 19 connected to the screen voltage feeder 18. The focusing voltage feeder 18 may be connected to the terminal C and the screen electrode by way of the lead conductor 19. The intermediate layer taking the form of a single insulating layer 17 in this modification may be replaced by a double layer structure such as having insulating layers 17a and 17b shown in FIGS. 6a and 6b.

As has been described, the high voltage rectifier according to the present invention comprises the unitary high voltage insulated cable comprised of the focusing voltage feeder covered by the screen voltage feeder and which is effective to prevent the focusing voltage feeder from being coupled electrostatically with the secondary coils and to prevent ringing voltages superposed on the focusing voltage developing on the focusing voltage feeder from being radiated from the focusing voltage feeder. Consequently, with the high voltage rectifier of this invention, it is possible to eliminate reception of the ringing voltages by a tuner and a video signal amplifier circuit and consequent occurrence of vertical stripes displayed on the picture screen of the television receiver set. Furthermore, the capacitance established between the focusing voltage and screen voltage feeders eliminates necessity of providing a separate capacitor to be connected across the focusing voltage and screen voltage feeders. As a result, the leakage current will not increase and the focusing and screen voltages can be kept constant, thereby preventing picture images displayed on the picture screen from becoming faded and brightness of picture images from being varied.

What is claimed is:

1. A high voltage rectifier for use in a television receiver set comprising:
   (a) a core;
   (b) a primary coil wound on a primary coil bobbin mounted on the core;
   (c) rectifier means including a plurality of secondary coils wound on a secondary coil bobbin which surrounds the primary coil bobbin, and one or more diodes connected in series with the plurality of secondary coils;
   (d) a casing which houses said primary and secondary coils and said diodes;
   (e) an insulating resin material filled in the casing to make integral the primary coil, secondary coils and diodes and to provide electrical insulation therebetween;
   (f) a resistor block, electrically connected to said rectifier means, for dividing voltage developing at said rectifier means so as to generate a first voltage and a second voltage which is lower than the first voltage;
   (g) means for fixing the resistor block to said casing near said secondary coils;
   (h) a first electrical conductor, electrically connected to said resistor block, for picking up the first voltage from said resistor block;
   (i) a second electrical conductor, electrically connected to said resistor block, for picking up the second voltage from said resistor block, said second electrical conductor surrounding the first electrical conductor to sealingly cover it and extending in the same direction as the first electrical conductor;
   (j) a first insulating member, interposed between the first and second electrical conductors, for insulating the two conductors under the application of DC voltage; and
   (k) a second insulating member covering the second electrical conductor.

2. A high voltage rectifier according to claim 1 wherein said first insulating member comprises a double layer structure which includes a cylindrical insulating layer made of polyethylene resin and surrounding said first electrical conductor to cover the same, and a cylindrical insulating layer made of vinyl chloride resin and surrounding the polyethylene resin layer to cover the same.

3. A high voltage rectifier according to claim 1 wherein said second electrical conductor comprises a cylindrical conductor made of electroconductive polyethylene and surrounding said first insulating member to cover the same, and an elongated metal conductor being in contact with the electroconductive polyethylene conductor longitudinally thereof.

4. A high voltage rectifier according to claim 1 wherein said first electrical conductor comprises a focusing voltage feeder for supplying a focusing voltage to a focusing electrode of a cathode ray tube, and said second electrical conductor comprises a screen voltage feeder for supplying a screen voltage to a screen electode of the cathode ray tube.

5. A high voltage rectifier according to claim 1 wherein the thickness of said first insulating member is such that a capacitance of 50 to 200 pF/m is established in a dielectric of the first insulating member between said first and second electrical conductors.

* * * * *